Feb. 27, 1940.   R. E. FROST   2,191,563
SIGNAL CONTROLLING MEANS
Filed Oct. 11, 1938   3 Sheets-Sheet 2
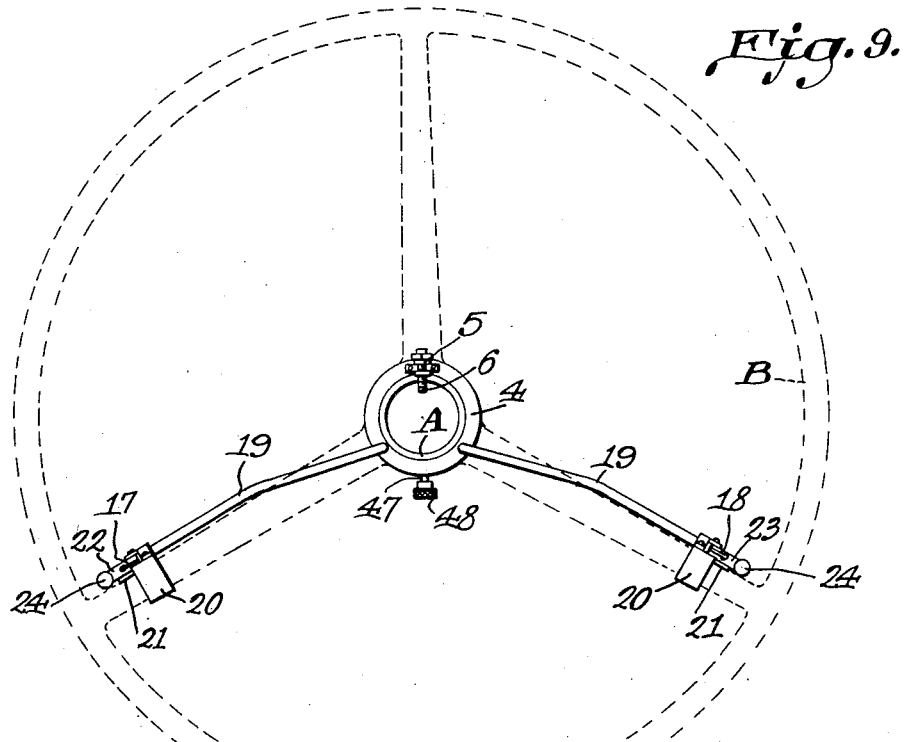
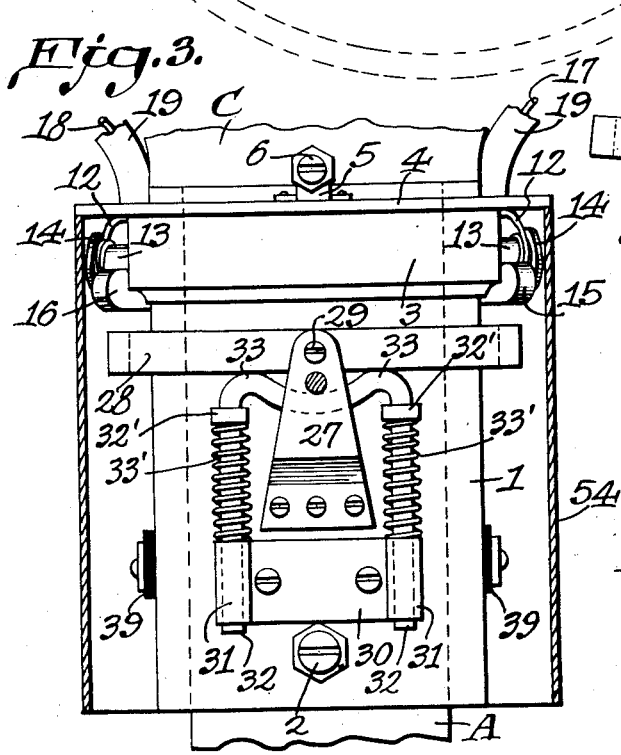
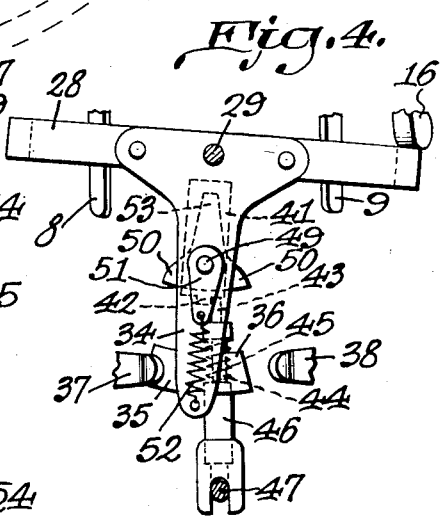
Russell E. Frost
INVENTOR.
BY
ATTORNEYS.

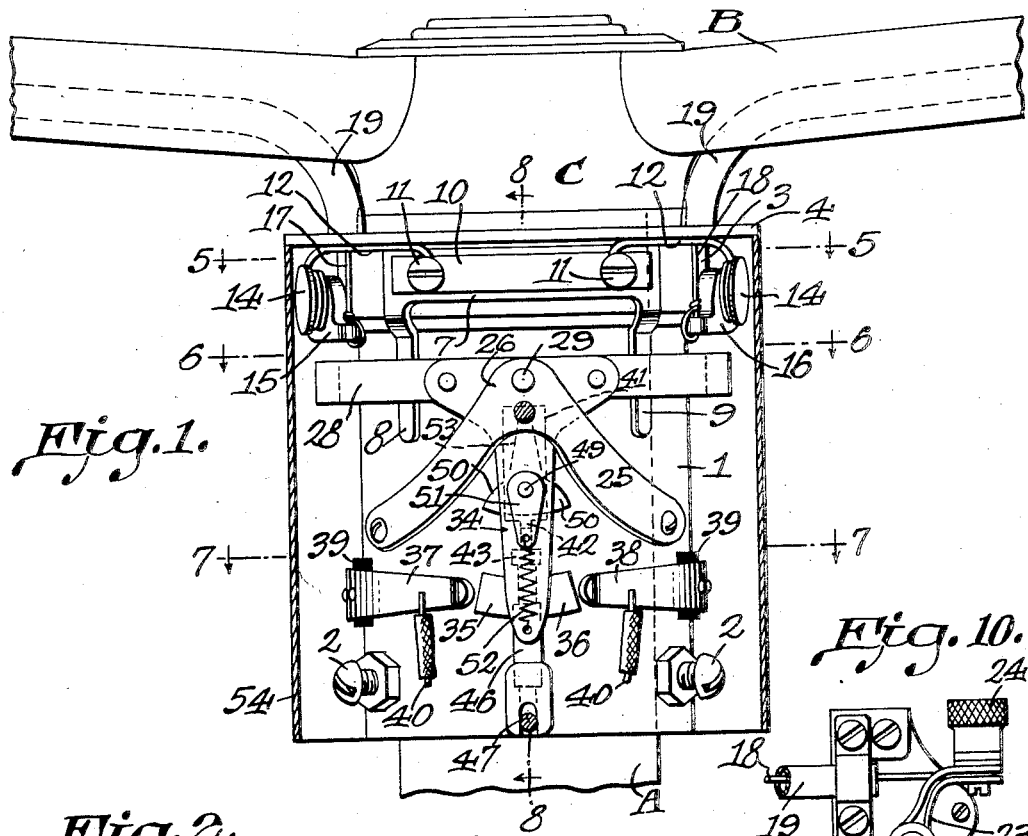
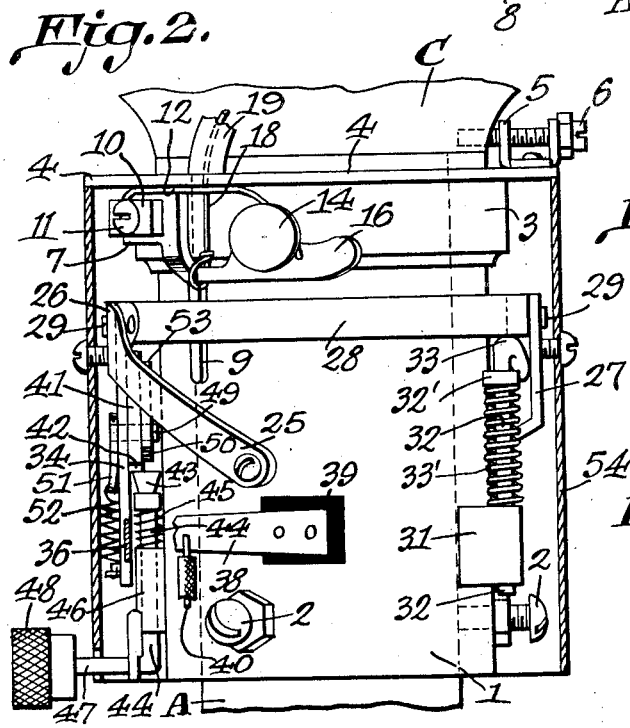
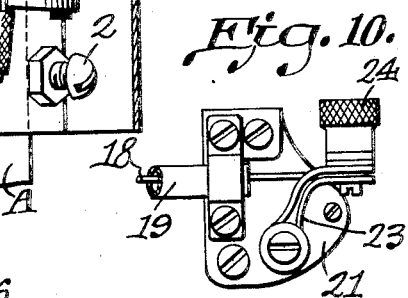
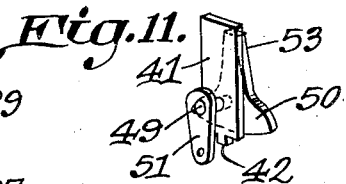

Feb. 27, 1940.  R. E. FROST  2,191,563
SIGNAL CONTROLLING MEANS
Filed Oct. 11, 1938   3 Sheets-Sheet 3
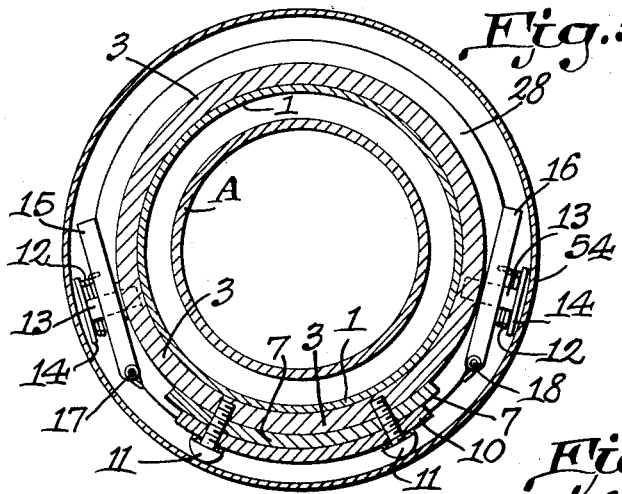
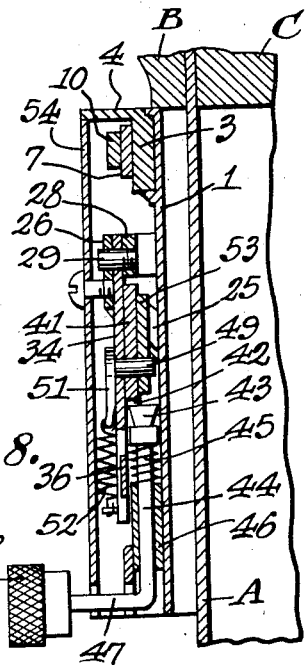
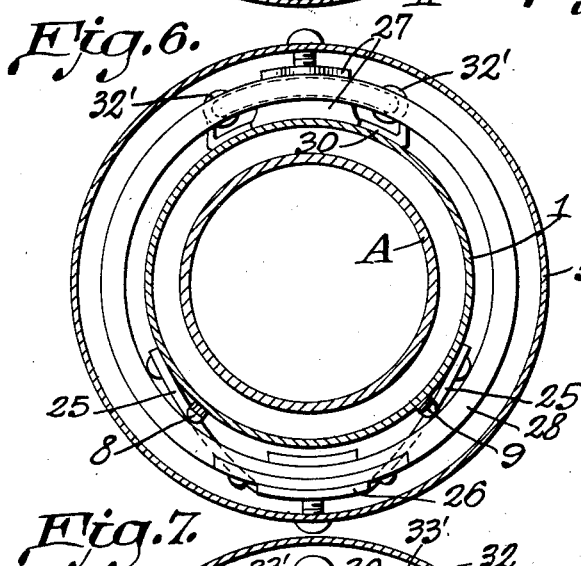
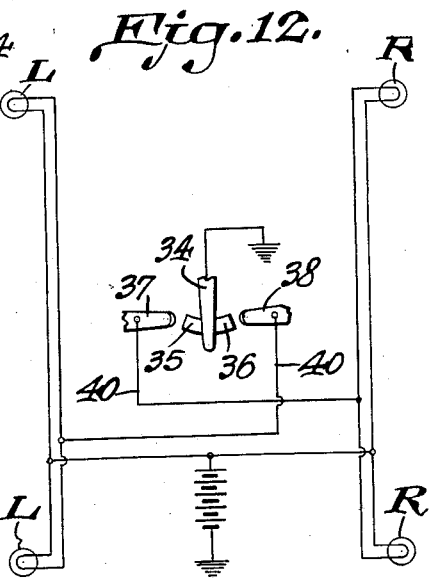
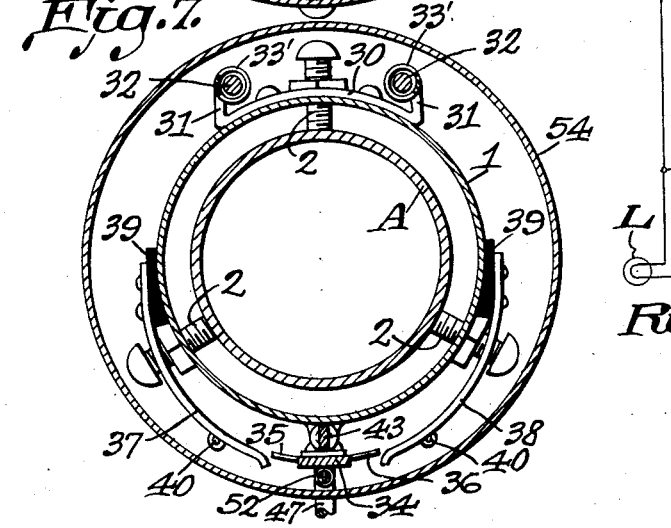
Russell E. Frost
INVENTOR.
BY
ATTORNEYS.

Patented Feb. 27, 1940

2,191,563

UNITED STATES PATENT OFFICE 2,191,563

SIGNAL CONTROLLING MEANS

Russell E. Frost, Oakland, Calif.

Application October 11, 1938, Serial No. 234,501

4 Claims. (Cl. 200—59)

This invention relates to signal controlling means designed primarily for use on motor vehicles, one of the objects being to provide said means with selective devices under the control of the driver whereby a desired signal can be operated before the wheel is turned, said wheel having means for cutting out the operated signal when the wheel is moved in the opposite direction after the vehicle has completed the turn indicated.

A further object is to provide controlling means which can be built into a vehicle as a part thereof or applied readily to vehicles already constructed.

A still further object is to provide a controlling means which is simple and compact in construction, can be located conveniently on the steering post and is at all times ready for actuation irrespective of the position of the wheel.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1 is an elevation of a portion of a steering wheel and post equipped with the present improvements, the casing of the signal control being shown in section.

Figure 2 is a similar view taken at right angles to Figure 1, parts being broken away.

Figure 3 is a similar view showing the parts at the side opposite to that shown in Figure 1.

Figure 4 is a detail view of a portion of the switch and its latch.

Figure 5 is a section on line 5—5, Figure 1.

Figure 6 is a section on line 6—6, Figure 1.

Figure 7 is a section on line 7—7, Figure 1.

Figure 8 is a vertical central section through the switch and its latch and adjacent parts, said section being taken on the line 8—8, Figure 1.

Figure 9 is a plan view of a steering wheel shown by broken lines and with the present improvements combined therewith.

Figure 10 is a detail view of one of the selective buttons of the switch.

Figure 11 is a detail perspective view of a portion of a switch.

Figure 12 is a diagram showing the circuits controlled by the switch.

Referring to the figures by characters of reference A designates a steering post on which is mounted a steering wheel B of the usual construction.

As has already been stated, the improvements constituting the present invention can be built into the steering post or can be applied thereto. In the structure illustrated the mechanism has been disclosed as a complete unit for attachment to the steering post and wheel of a vehicle. This unit includes a base 1 which can be in the form of a sleeve surrounding the post A and held tightly thereto in any desired position by set screws 2.

A ring 3 is mounted for rotation upon the upper portion of the sleeve 1 and is adapted to be secured in any suitable manner to the hub C of wheel B so as to rotate therewith and relative to sleeve 1. For example this ring 3 can be formed with an annular flange 4 having one or more brackets 5 carrying screws 6 which are insertible into the hub C as shown, for example in Figure 2.

An arcuate plate 7 is fitted to that portion of the periphery of ring 3 which faces the driver when the wheel B is in normal or straight ahead position. This plate has depending tripping fingers 8 and 9 at its end which are supported close to the surface of sleeve 1. A strip 10 is mounted on plate 7, this strip and the plate being held in position on ring 3 by screws 11 which can also serve as anchoring means for springs 12.

Plate 7 is interposed between studs 13 extending radially from the ring and each having a head 14 at its outer end. Mounted on these studs are thrust levers 15 and 16 respectively. The springs 12 are coiled about the respective studs 13 and have their ends attached to the respective levers 15 and 16 so as to hold the free ends of these levers normally elevated. The other ends of the levers are connected to wires 17 and 18 which extend upwardly through openings in flange 4 and longitudinally within rigid guide tubes 19 which are secured to the wheel B and extend to points adjacent to the rim thereof as shown particularly in Figure 9. The outer portions of these guide tubes are attached to the adjacent spokes of the wheel by clips 20 carrying plates 21. Levers 22 and 23 are mounted on the respective plates and are provided with push-buttons 24. The wires 17 and 18 are attached to the free ends of the respective levers 22 and 23. Thus when the button 24 on lever 23 is pushed downwardly by the finger of a hand grasping the steering wheel, it will pull through the wire 18 upon the lever 16 to which it is connected, thereby causing the free end of said lever to swing downwardly against the action of its coiled spring 12. When lever 23 is released, however, the said spring 12 will return all of their parts to normal positions. Obviously when the button 24 on the other lever 23 is depressed, motion is similarly transmitted through the wire 18 to the other lever 15 so as to depress the free end thereof against the action of its spring 12.

A bracket 25 is secured to sleeve 1 and has an upwardly extending portion 26 spaced from the sleeve and located substantially beneath the central portion of the plate 7. Another bracket 27 is located on the sleeve 1 diametrically opposite the bracket 25 and is likewise spaced at its upper ends from sleeve 1.

A tiltable ring 28 is fitted loosely about sleeve 1 and is spaced therefrom a sufficient distance to permit a limited tilting movement of the ring relative to the sleeve. This ring is pivotally connected at diametrically opposed points to the upper portion of the brackets 25 and 27, as shown at 29 and the free end portions of levers 15 and 16 overlie this ring at opposite sides respectively of its axis of movement. This will be apparent by referring to Figure 3.

For the purpose of holding the ring normally in a substantially horizontal position, a guide plate 30 is secured to sleeve 1 beneath bracket 27 and has terminal guide sleeves 31 in which are slidably mounted the ends of an inverted yoke 32 the upper or crown portion of which is located beneath ring 28 and between brackets 27 and sleeve 1. This crown portion is shaped to bear against ring 28 at opposite sides of its axis of rotation, as shown at 33 and as spring 33' are mounted on the side portions of the yoke and between sleeves 31 and collars 32' on the yoke, said yoke tends normally to thrust against the ring 28 so as to maintain it in a substantially horizontal position. However when the ring is tilted in either direction about its axis, the yoke will be depressed against the action of its spring. When the ring is released the spring-actuated yoke will return it to its normal position.

Fixedly connected to the ring 28 and depending therefrom beneath its axis of movement, is a tongue 34 having oppositely extending contact blades 35 and 36 which normally are interposed between and spaced from opposed spring contacts 37 and 38 which are secured to but insulated from the sleeve 1 as indicated at 39 and wires 40 are connected to the respective spring contacts and are extended to the respective signals to be operated, it being understood that these signals are grounded to the vehicle, post A, and the parts mounted on the post so that a circuit is completed to one of the signals when one of the contact blades 35 or 36 is brought into engagement with one of the contact springs 37 or 38. These signal circuits have been clearly illustrated in Figure 12, it being obvious that the lamps L at one side of the vehicle are energized when the switch tongue 34 is moved in one direction while the lamps R are energized when the switch tongue is moved in the opposite direction.

A plate 41 is fixedly secured to the tongue 34 and is provided at its lower end with an angular tooth or its equivalent, as indicated at 42, the same being located above the level of the contact blades 35 and 36. This tooth or projection normally bears upon the upper edge of a latch 43 the stem 44 of which is yieldingly supported by a spring 45 and slidable within a guide 46. The stem has a finger 47 extending at an angle therefrom to a point where it can be conveniently reached for actuation, there being an operating knob or handle 48 on the end of this finger as shown. It is to be understood that when the tongue 34 is in its normal or intermediate position, the tooth 42 is engaged and serves as a stop for the latch 43, as has been illustrated in Figures 2 and 4.

A pin 49 is mounted for rotation in tongue 34 and plate 41 and is provided, at that end nearest sleeve 1, with a rock cam 50 which overlies and is normally spaced from the latch 43. This cam is held normally in a balanced position by a crank arm 51 secured to the outer end of pin 49 there being a spring 52 connecting the lower end of this crank arm to the lower portion of tongue 34 so as to exert a constant pull upon the crank arm and maintain the cam normally in the position shown in Figure 1. The cam 50 has its bottom edge curved upwardly toward the ends of the cam as shown particularly in Figures 1 and 4 and constitutes, in effect, a beveled pawl. This cam has an upwardly projecting finger 53 which extends into the path of the tripping fingers 8 and 9 as shown in Figure 4.

As has already been stated the mechanism thus far described can be built into the vehicle. It can be contained in a housing forming a part of the steering post or it can be located at some other point convenient to the wheel. In the present case, however, the mechanism is in the form of an attachment mounted on the post and, for the purpose of protecting the mechanism, it is located in an outer casing or housing 54. Thus all of the mechanism is concealed.

Normally, as will be apparent, the connection between the parts 35 and 37, and the parts 36 and 38 is broken so that the signals will be out of circuit. When the driver is about to make a turn he first presses the button 24 at that side to which the wheel B is to be turned. For example if a right-hand turn is to be made the driver depresses the button 24 connected to lever 23. Thus motion is transmitted from the lever through the flexible connection 18 to the lever 16 which is thus caused to swing against the action of its spring 12 and to move downwardly against ring 28, causing the latter to swing about its axis 29 and also causing the tooth 42 to move off of the end of the latch 43 which thus will spring upwardly to one side of the tooth and hold the ring in its tilted position. During this movement the ring 28 swings tongue 34 laterally so that the contact 35 moves into engagement with contact 37, thereby closing the circuit to the signals R so as to indicate that a right turn is about to be made. The driver turns the wheel to the right and finger 9 snaps past the finger 53 on pawl 50, the pawl being shifted momentarily against the action of spring 52 which promptly thereafter returns the pawl to its normal position. Thus the finger 9 assumes a position to the left of finger 53 and as soon as the turn is completed and the driver begins to turn the wheel in the opposite direction so as to drive ahead, the finger 9 moving back toward its normal position at the right in Figure 1, comes against finger 53. When tongue 34 was shifted by the tilting of ring 28, the right end portion of the pawl or cam 50, as viewed in Figure 1, assumed a position over the end of the lifted latch 43. When finger 9 moved back toward the position shown in Figure 1 during the righting of the wheel B, said finger was brought against finger 53 and actuated it. This operation caused the right-hand end of the cam or pawl 50 to press downwardly on the latch so as to push it below the level of the tooth 42. Consequently the spring 52 immediately acted to restore the cam or pawl 50 to its normal position while at the same time the ring 28 and its tongue 34, being released, were restored to their normal positions with the latch thrusting against the tooth 42.

As a result of the foregoing action the circuit to the signal is broken and the parts are all set so that thereafter the wheel can be turned back and forth and the fingers 8 and 9 snap back and forth past the finger 53 of the cam or pawl 50 without causing actuation of any of the other parts. Only by actuating one of the levers 15 or 16, can the selected signal be operated.

If, at any time, it should be desired to disengage the latch without depending upon the other mechanism, it merely would be necessary to pull downwardly on the latch by pressing on the knob or handle 48.

What is claimed is:

1. Signal controlling means for motor vehicles and the like including a steering wheel, a ring tiltably mounted, separate means rotatable with the wheel for tilting the ring in opposite directions respectively, means on the wheel for actuating the respective ring tilting means, separate signal circuits, means movable with the ring when tilted for closing either of said circuits, a latch for holding the ring and circuit closing means in either of its extreme positions, a cam supported adjacent to but normally out of contact with the latch, means movable with the wheel during the rotation thereof in a direction opposite to that in which the vehicle has been turned, for actuating the cam to disengage the latch and release the tiltable ring, and yieldable means for returning the ring and the parts carried thereby to their normal positions when released.

2. Signal controlling means for motor vehicles and the like including a steering wheel, a ring tiltably mounted, separate means rotatable with the wheel for tilting the ring in opposite directions respectively, means on the wheel for actuating the respective ring tilting means, separate signal circuits, means movable with the ring when tilted for closing either of said circuits, a latch for holding the ring and circuit closing means in either of its extreme positions, a cam supported adjacent to but normally out of contact with the latch, means movable with the wheel during the rotation thereof in a direction opposite to that in which the vehicle has been turned, for actuating the cam to disengage the latch and release the tiltable ring, said means including spaced fingers carried by the wheel, a projecting portion on the cam extending into the path of the fingers for displacement by one of the fingers while moving with the wheel during the turning of the vehicle and for actuation by the same finger during the turning of the wheel in the opposite direction following the turning of the vehicle, thereby to transmit thrust through the cam to the latch to disengage it, and resilient means for returning the ring and parts carried thereby to normal positions when the latch is disengaged.

3. In a signal control device the combination with a steering wheel, of spaced contacts oppositely disposed and fixedly mounted, a switch element mounted for oscillation between the contacts and normally spaced therefrom, a ring tiltably mounted relative to the wheel and connected to and movable with the said switch element, selective means on the wheel for tilting the ring and the switch member in either of two directions, a latch for holding said switch member in either extreme position while in engagement with one of the contacts, and means rotatable with the wheel for releasing the switch member from the latch.

4. In a signal control device the combination with a steering wheel, of spaced contacts oppositely disposed and fixedly mounted, a switch element mounted for oscillation between the contacts and normally spaced therefrom, a ring tiltably mounted relative to the wheel and connected to and movable with the said switch element, selective means on the wheel for tilting the ring and the switch member in either of two directions, a latch for holding said switch member in either extreme position while in engagement with one of the contacts, means rotatable with the wheel for releasing the switch member from the latch, and yielding means engaged by the ring for maintaining said ring and the switch member normally in an intermediate position.

RUSSELL E. FROST.